UNITED STATES PATENT OFFICE.

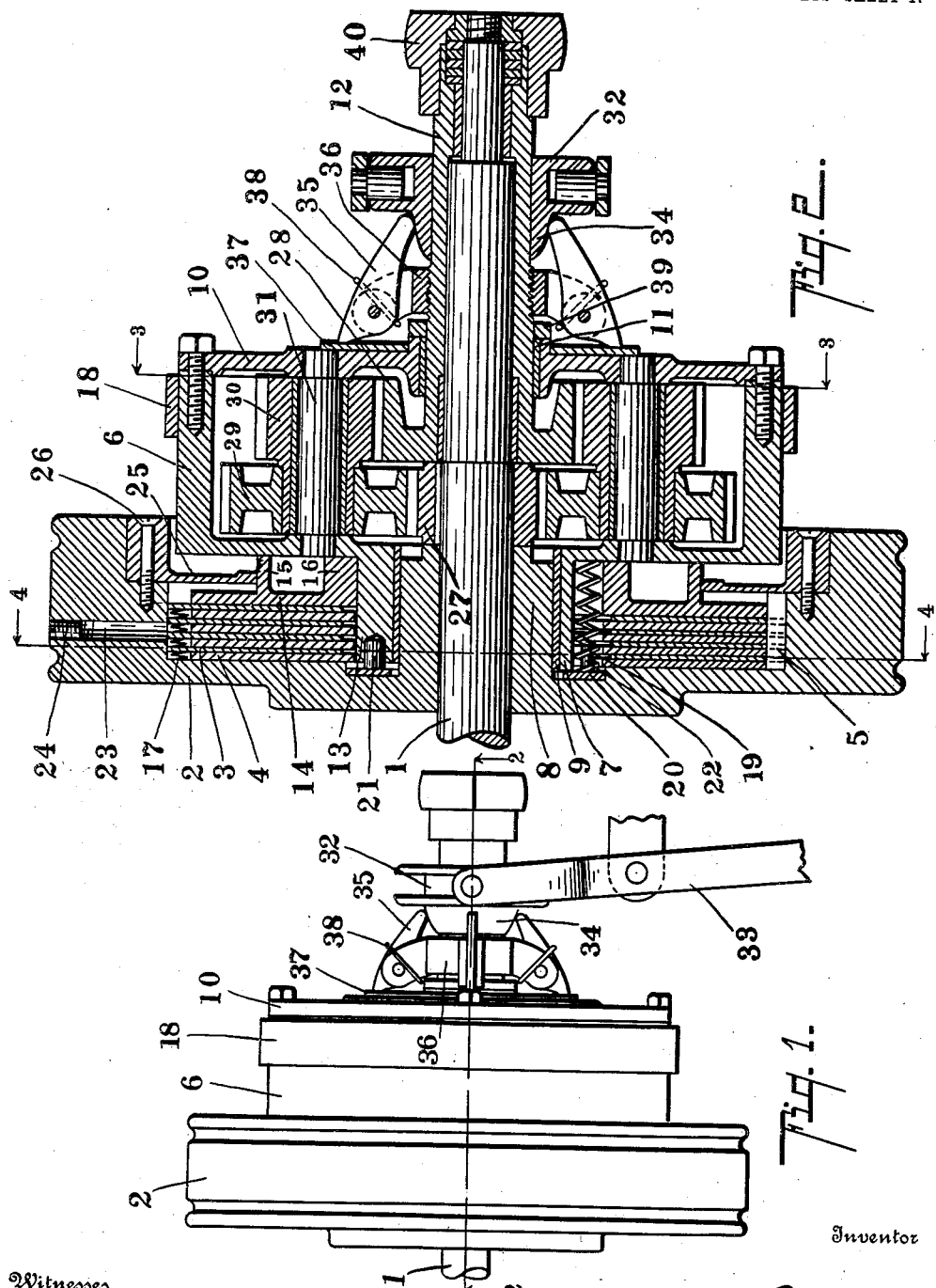

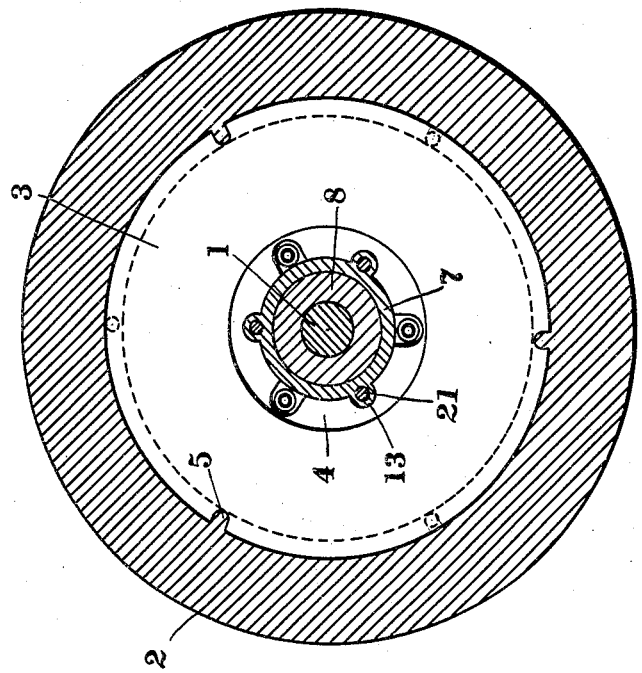
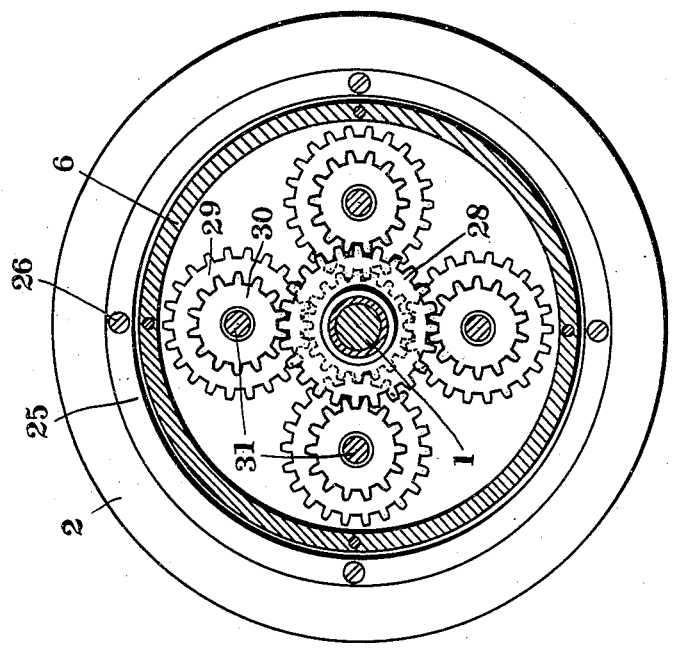

WILLIAM S. HOVEY, OF THREE RIVERS, MICHIGAN, ASSIGNOR TO THE SHEFFIELD CAR COMPANY, OF THREE RIVERS, MICHIGAN.

TRANSMISSION-GEAR.

939,914.  Specification of Letters Patent.  Patented Nov. 9, 1909.

Original application filed January 14, 1907, Serial No. 352,222. Divided and this application filed November 2, 1908. Serial No. 460,691.

*To all whom it may concern:*

Be it known that I, WILLIAM S. HOVEY, a citizen of the United States, residing at the city of Three Rivers, county of St. Joseph, State of Michigan, have invented certain new and useful Improvements in Transmission-Gear, of which the following is a specification.

This invention relates to improvements in transmission gears.

My improved transmission gearing is particularly adapted for use in a variable speed and reversing transmission gear mechanism, such as is illustrated in my application for Letters Patent filed January 14th, 1907, Serial No. 352,222, of which this is a divisional application, although it may be readily adapted and is desirable for use in various other relations.

The main objects of this invention are: first, to provide an improved transmission mechanism in which the fly wheel of the engine forms one element of the clutch and the transmission gear casing another; second, to provide an improved transmission gearing in which the parts are arranged and connected so that the strain thereon is minimized; and third, to provide an improved transmission gearing having a clutch of the friction disk type in which the disks are inclosed so that they may be effectively lubricated.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which,—

Figure 1 is a side elevation of a structure embodying the features of my invention. Fig. 2 is a longitudinal section thereof taken on a line corresponding to line 2.2 of Fig. 1. Fig. 3 is a cross section, taken on a line corresponding to line 3—3 of Fig. 2. Fig. 4 is a cross section taken on a line corresponding to line 4—4 of Fig. 2.

In the drawing, the sectional views are taken looking in the direction of the little arrows at the ends of the section lines, and similar numerals of reference refer to similar parts throughout the several views.

Referring to the drawing, 1 represents the crank shaft of an engine, and 2 the fly-wheel. The fly-wheel 2 is chambered, being open on one side. Within the fly-wheel, I arrange the friction disks 3 and 4, there being a plurality of each, the disks 3 being preferably of steel and the disks 4 being preferably of brass to insure a good frictional contact. The disks 3 are notched at their peripheries to engage the rib-like projections 5 on the inside of the rim of the fly-wheel, so that they are connected to revolve therewith. There are preferably a plurality of these projections 5, three being provided in the structure illustrated. On the open side of the fly-wheel, I arrange the planetary gear case 6, which projects into the chamber of the fly-wheel. This gear case 6 is provided with a hub 7, which embraces the hub 8 of the fly-wheel, and is rotatably and longitudinally movable thereon, a suitable bushing, as 9, being provided therefor. The face plate 10 of the gear casing 6 is provided with a bushing 11 on the sleeve 12, the sleeve being revolubly mounted on the shaft 1.

The hub 7 of the gear case is provided with ribs 13 adapted to engage suitable notches in the inner edges of the friction disks 4, so that they are connected to revolve with the gear case. Interposed between the gear case and the friction disks is a disk-like clamping plate 14 having annular flange-like projections 15 and 16, against which the gear case bears when the clutch is engaged. When the gear case is shifted outwardly to release the clutch, the disks are separated by springs 17, which are arranged between the disks 3, as clearly appears from the drawing.

When the clutch is engaged, it is obvious that the gear case is revolved with the fly-wheel and when it is released it is freed therefrom, allowing the fly-wheel to turn without turning the gear case. A brake-band, as 18, is provided for the gear case, so that the gear case may be locked against rotation. This brake-band is of the well-known band type, and is operated by means of a suitable lever not here illustrated. To insure the freeing of the disks, when the gear case is released, I provide coiled springs 19, one end of each of which bears against the gear case, and the other against the thrust ring 20, which is arranged at the inner end of the gear case hub, as clearly appears from the drawing. This ring is adapted to turn with the gear case, and is connected thereto by means of the pins 21, which engage the projections 13 on the gear case hub; see Figs. 2 and 4. The ring is provided with pins 22, adapted to receive the springs 19, as appears in Fig. 2. The fly-wheel is provided with an oil-hole 23, through which oil may be introduced into the disk chamber, a suitable plug as 24 being provided for the oil-hole. The open side of the fly-wheel is substantially closed by means of the ring 25, which is arranged between the clamping plate 14 and the gear case, the ring extending inwardly to the flange 15 on the clamping plate, so that a substantially closed chamber is provided for the clutch disks, not only forming a lubricant chamber, but excluding dust and the like as well. This plate is detachably secured to the fly-wheel by means of the screws 26, so that the parts can be readily assembled or disassembled.

Within the gear case 6 is a planetary reduction gearing consisting of the gear 27, which is keyed to the shaft 1, and the gear 28, on the sleeve 12. These gears are connected by intermediate connecting gears 29 and 30, which are mounted on spindles 31. Thus arranged, when the gear case 6 is clutched to the fly-wheel so as to revolve therewith, the sleeve 12 is driven at the same speed as the crank shaft. When the clutch is released and the gear case held against revolution, the sleeve is driven through the reducing gears at a reduced speed. The gear case is forced inwardly to clamp the disks by means of the collar 32, which is slidably mounted on the sleeve, the collar being shifted by means of the forked lever 33. This collar is provided with a conical portion 34, adapted to engage the dogs 35 carried by a spider 36, which is threaded upon the sleeve. By shifting the collar 32 inwardly, the dogs are engaged with the friction plate 37, which bears against the face plate 10 of the gear case. The spider 36 is preferably threaded on the sleeve, as stated, so that the position of the dogs may be regulated. When the collar 32 is drawn back, the dogs are held out of their engaging position by the springs 38. The plate 37 is preferably of hardened steel, so that the toes or inner ends of the dogs are not likely to dig into the same in the event that the gear case is turning at a different rate of speed than that of the sleeve, when the collar is shifted. The collar 39 limits the outward movement of the gear case, so that the plate 37 is freed from the dogs when they are in their disengaging position. The sleeve is provided with a suitable coupling member 40, through which it is connected to the driven shaft or member. As the details of this connection form no part of this invention, I do not describe the same herein.

By this arrangement of the parts, I secure a transmission mechanism which is simple in structure and very compact, the fly-wheel of the engine being utilized as one of the clutch members thereof and a casing therefor. I also utilize the reducing gear case as a clutch member.

I have illustrated and described my improved transmission mechanism in detail in the form preferred by me on account of structural simplicity. I am, however, aware that the structure illustrated is capable of considerable variation in structural details without departing from my invention.

Having thus described my invention, what I claim as new and desire to secure by Letters Patent is:

1. The combination of a driving shaft; a chambered fly-wheel open at one side; a revolubly-mounted longitudinally adjustable member having a hub projecting into and rotatably and slidably mounted on the hub of said fly-wheel; a plurality of friction disks arranged within said fly-wheel and connected to revolve therewith; a plurality of friction disks connected to said hub of said adjustable member to revolve therewith, interposed between said disks connected to said fly-wheel; a clamping disk revolubly mounted on the hub of said adjustable member and adapted to bear against the outer friction disk; a plurality of coiled springs arranged to hold said adjustable member normally outward; a thrust ring for the inner ends of said springs arranged in said fly-wheel; projecting pins on said thrust ring arranged to engage the hub of said adjustable member; an annular plate projecting inwardly from the rim of said fly-wheel between said clamping disk and said adjustable member; and means for shifting said adjustable member.

2. The combination of a driving shaft; a chambered fly-wheel open at one side; a revolubly mounted longitudinally adjustable member having a hub projecting into and rotatably and slidably mounted on the hub of said fly-wheel; a plurality of friction disks arranged within said fly-wheel and connected to revolve therewith; a plurality of friction disks connected to said hub of said adjustable member to revolve therewith, interposed between said disks connected to said fly-wheel; a clamping disk revolubly mounted on the hub of said adjustable member and adapted to bear against the outer friction disk; an annular plate projecting inwardly from the rim of said fly-wheel between said clamping disk and said adjustable member; and means for shifting said adjustable member.

3. The combination of a driving shaft; a chambered fly-wheel open at one side; a revolubly-mounted longitudinally adjustable member having a hub projecting into and rotatably and slidably mounted on the hub of said fly-wheel; a plurality of friction disks arranged within said fly-wheel and connected to revolve therewith; a plurality of friction disks connected to said hub of said adjustable member to revolve therewith, interposed between said disks connected to said fly-wheel; a clamping disk revolubly mounted on the hub of said adjustable member and adapted to bear against the outer friction disk; a plurality of coiled springs arranged to hold said adjustable member normally outward; a thrust ring for the inner ends of said springs arranged in said fly-wheel; projecting pins on said thrust ring arranged to engage the hub of said adjustable member; and means for shifting said adjustable member.

4. The combination of a driving shaft; a chambered fly-wheel open at one side; a revolubly-mounted longitudinally adjustable member having a hub projecting into and rotatably and slidably mounted on the hub of said fly-wheel; a plurality of friction disks arranged within said fly-wheel and connected to revolve therewith; a plurality of friction disks connected to said hub of said adjustable member to revolve therewith, interposed between said disks connected to said fly-wheel; a clamping disk revolubly mounted on the hub of said adjustable member and adapted to bear against the outer friction disk; and means for shifting said adjustable member.

5. The combination of a driving shaft; a chambered fly-wheel open at one side; a revolubly-mounted longitudinally adjustable member having a hub projecting into and rotatably and slidably mounted on the hub of said fly-wheel; a plurality of friction disks arranged within said fly-wheel and connected to revolve therewith; a plurality of friction disks connected to said hub of said adjustable member to revolve therewith, interposed between said disks connected to said fly-wheel; a plurality of coiled springs arranged to hold said adjustable member normally outward; a thrust ring for the inner ends of said springs arranged in said fly-wheel; projecting pins on said thrust ring arranged to engage the hub of said adjustable member; and means for shifting said adjustable member.

6. The combination of a driving shaft; a chambered fly-wheel open at one side; a revolubly-mounted longitudinally adjustable member having a hub projecting into and rotatably and slidably mounted on the hub of said fly-wheel; a plurality of friction disks arranged within said fly-wheel and connected to revolve therewith; a plurality of friction disks connected to said hub of said adjustable member to revolve therewith, interposed between said disks connected to said fly-wheel; a revolubly mounted clamping member adapted to bear against the outer disk; and an annular plate projecting inwardly from the rim of said fly wheel to inclose said clamping member; and means for shifting said adjustable member.

7. The combination of a driving shaft; a chambered fly-wheel open at one side; a revolubly-mounted longitudinally adjustable member projecting into said fly-wheel; a plurality of friction disks connected to said fly-wheel; a plurality of friction disks connected to said adjustable member interposed between said disks connected to said fly-wheel; a revolubly mounted clamping member adapted to bear against the outer disk; and an annular plate projecting inwardly from the rim of said fly wheel to inclose said clamping member; and means for shifting said adjustable member to clamp said friction disks together.

In witness whereof, I have hereunto set my hand and seal in the presence of two witnesses.

WILLIAM S. HOVEY. [L. S.]

Witnesses:
  ORLEY R. BAIRD,
  D. C. MIX.